United States Patent [19]

Kobayashi

[11] Patent Number: 5,410,432
[45] Date of Patent: Apr. 25, 1995

[54] DIAPHRAGM MECHANISM OF ZOOM LENS BARREL

[75] Inventor: Tomoaki Kobayashi, Tokyo, Japan

[73] Assignee: Asahi Kogaku Kogyo Kabushiki Kaisha, Tokyo, Japan

[21] Appl. No.: 963,998

[22] Filed: Oct. 21, 1992

[30] Foreign Application Priority Data

Oct. 23, 1991 [JP] Japan ................................ 3-339284

[51] Int. Cl.⁶ ........................ G02B 9/08; G02B 15/14; G03B 9/02
[52] U.S. Cl. ...................... 359/740; 359/694; 359/699; 359/738; 354/271.1; 354/274
[58] Field of Search ................ 359/694–707, 359/738–740, 227, 235–236, 813, 823; 354/271.1, 286, 455, 274, 195.1–195.13

[56] References Cited

U.S. PATENT DOCUMENTS

| | | | |
|---|---|---|---|
| 4,141,636 | 2/1979 | Shimojima | 359/701 |
| 4,289,385 | 9/1981 | Yamagata | 359/769 |
| 4,299,470 | 11/1981 | Shimizu | 359/826 |
| 4,464,040 | 8/1984 | Okura et al. | 354/455 |
| 4,473,278 | 9/1984 | Hama | 359/694 |
| 4,473,281 | 9/1984 | Hama | 354/271.1 |
| 4,487,482 | 12/1984 | Itoh et al. | 359/699 |
| 4,525,037 | 6/1985 | Metabi | 359/699 |
| 4,634,250 | 1/1987 | Kolwai | 354/195.11 |
| 4,636,041 | 1/1987 | Kotaka et al. | 359/694 |
| 4,666,277 | 5/1987 | Tanaka | 359/739 |
| 5,250,971 | 10/1993 | Okura | 354/274 |

FOREIGN PATENT DOCUMENTS

| | | |
|---|---|---|
| 47-8146 | 9/1972 | Japan . |
| 57-119325 | 7/1982 | Japan . |
| 2086608 | 5/1982 | United Kingdom . |

*Primary Examiner*—Loha Ben
*Assistant Examiner*—Thong Nguyen
*Attorney, Agent, or Firm*—Sandler, Greenblum & Bernstein

[57] ABSTRACT

A diaphragm mechanism in a zoom lens barrel includes a front movable lens group which is moved together with the diaphragm mechanism, a rear movable lens group located behind the front movable lens group, a diaphragm driving member which can engage with a diaphragm driving member provided on an associated camera body, and an intermediate drive transmitting member which transmits movement of the diaphragm driving member of the lens barrel to the diaphragm mechanism which is provided with a rear lens frame holding the rear movable lens group. The intermediate drive transmitting member is supported on the rear lens frame.

22 Claims, 8 Drawing Sheets

DIAPHRAGM MECHANISM OF ZOOM LENS BARREL

BACKGROUND OF THE INVENTION

1. Field of the Invention

The present invention relates to a diaphragm mechanism of a zoom lens barrel used in an interchangeable lens camera. More precisely, it relates to an apparatus for driving a diaphragm mechanism of a zoom lens barrel in which the diaphragm mechanism is provided on a movable front lens group in front of a rearmost lens group, from a camera body side.

2. Description of Related Art

In a known zoom lens barrel for a single lens reflex camera including, for example, three lens groups, a diaphragm mechanism is usually provided on the second lens group located in front of the rearmost (third) lens group.

There are two types of diaphragm mechanisms, i.e., a normally open type and a normally closed type in which the diaphragm (aperture) is biased to be opened and closed when the lens barrel is detached from the camera body, respectively. In either type, the diaphragm which is fully opened in a normal state stops-down to a predetermined diaphragm value when the shutter is released. To this end, the zoom lens barrel is provided with an association mechanism which is associated with a drive member of the camera body. The association mechanism is usually comprised of an intermediate drive transmitting member (lever) which is provided on a supporting lens frame of the second lens group, on which the diaphragm mechanism is provided to actuate the diaphragm mechanism, and a diaphragm driving member (lever) which is provided on the rear portion of the lens barrel to be associated with the drive member of the camera body. The diaphragm driving member of the lens barrel is functionally connected to the intermediate drive transmitting member. Consequently, in the known mechanism, it is necessary to lengthen the arm of the diaphragm driving member (lever) and/or the intermediate drive transmitting member (lever) in order to increase the displacement of the second lens group. In such case, however, the diaphragm driving lever or the intermediate drive transmitting lever tends to be inclined or deflected due to the increased arm length thereof, thus resulting in an inaccurate or unstable control of the diaphragm. Furthermore, it is necessary to provide a large space (e.g., recess or cut-away portion) in which the diaphragm driving lever or the intermediate drive transmitting lever can be displaced This causes harmful internal reflection or allows passage of stray light.

SUMMARY OF THE INVENTION

The primary object of the present invention is to provide a diaphragm mechanism which is provided on a movable lens group located in front of a rearmost lens group, wherein a high diaphragm precision can be obtained even when there is a large displacement of the movable lens group, while preventing harmful internal reflection or stray light. To achieve the object mentioned above, the present invention is focuses on the supporting mechanism of the intermediate drive transmitting member. In the prior art, the intermediate drive transmitting member is supported on the lens frame on which the diaphragm mechanism is provided. In the present invention, however, the intermediate drive transmitting member is supported on a rear lens frame located behind the lens frame on which the diaphragm mechanism is provided, so that the arm (lever) length of the intermediate drive transmitting member (and/or the diaphragm driving member) can be shortened in comparison with the prior art.

According to the present invention, there is provided a diaphragm mechanism in a zoom lens barrel including a front movable lens group which is moved together with the diaphragm mechanism, a rear movable lens group located behind the front movable lens group, a diaphragm driving member which can engage with a diaphragm driving member provided on an associated camera body, and an intermediate drive transmitting member which transmits the movement of the diaphragm driving member of the lens barrel to the diaphragm mechanism. The diaphragm mechanism has a rear lens frame which holds the rear movable lens group. The intermediate drive transmitting member is supported on the rear lens frame.

With this arrangement, the arm (lever) length of the intermediate drive transmitting member (and/or the diaphragm driving member) can be shortened in comparison with prior art.

The intermediate drive transmitting member includes, for example, an intermediate lever which is pivoted at an intermediate portion thereof with respect to the rear lens frame, or an intermediate ring which is supported on the rear lens frame so as to rotate about an optical axis of the lens barrel.

According to another aspect of the present invention, there is provided a zoom lens barrel of an interchangeable lens camera having first, second and third movable lens groups having a second lens frame which supports the second movable lens group, a third lens frame which supports the third movable lens group, a diaphragm mechanism which is provided on the lens frame, a diaphragm driving member which can be engaged by a diaphragm driving member provided on a camera body to be driven thereby, and an intermediate drive transmitting member which is provided on the third lens frame to transmit movement of the diaphragm driving member of the zoom lens barrel to the diaphragm mechanism.

According to still another aspect of the present invention, a zoom lens barrel of an interchangeable lens camera having a diaphragm mechanism includes a diaphragm driving member which can be engaged by a diaphragm driving member provided on a camera body to be driven thereby, and an intermediate drive transmitting member which transmits movement of the diaphragm driving member of the zoom lens barrel to the diaphragm mechanism in the zoom lens barrel. The diaphragm mechanism has a diaphragm opening and closing ring which rotates to open and close the diaphragm. The diaphragm opening and closing ring is provided with an opening and closing lever which engages with the intermediate drive transmitting member, and an aperture restricting lever which can be engaged by an aperture restricting portion provided in the lens barrel at a predetermined circumferential position to determine an aperture diameter.

The present disclosure relates to subject matter contained in Japanese patent application No. 3-339284 (filed on Oct. 23, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 9:
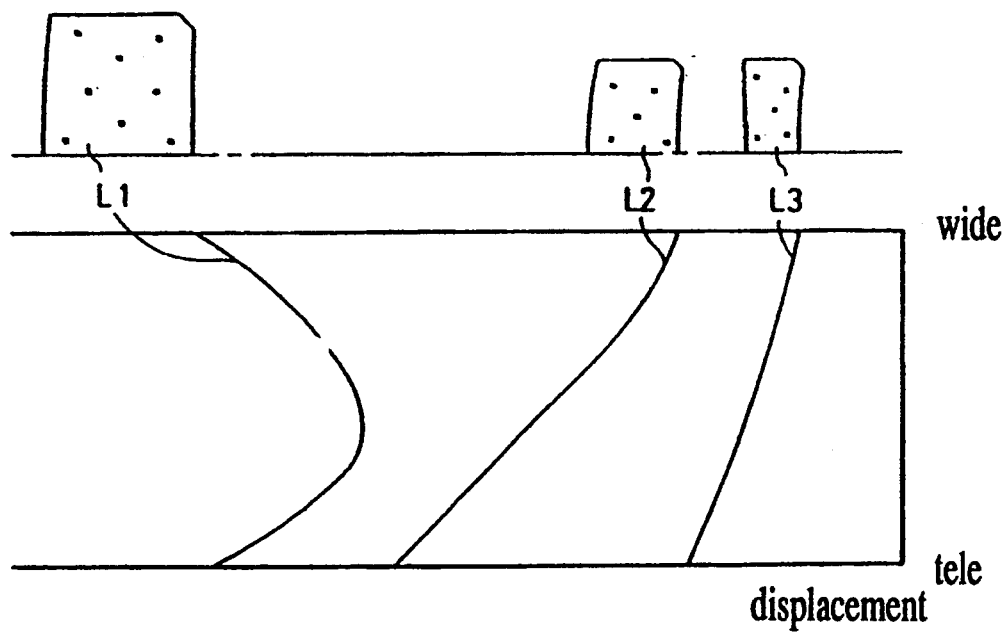

FIG. 9 shows an example of tracks along which three lens groups (first, second and third lens groups L1, L2 and L3) of a zoom lens, according to the present invention, move. The diaphragm mechanism is provided on a support of the second lens group L2 whose displacement is largest. The present invention is aimed at the provision of an apparatus in which the diaphragm mechanism can be precisely actuated by the diaphragm driving member on the camera body throughout the zoom range in a zoom lens barrel in which the diaphragm mechanism is provided on the second lens group L2 located in front of the rearmost lens group.

Figure 1:
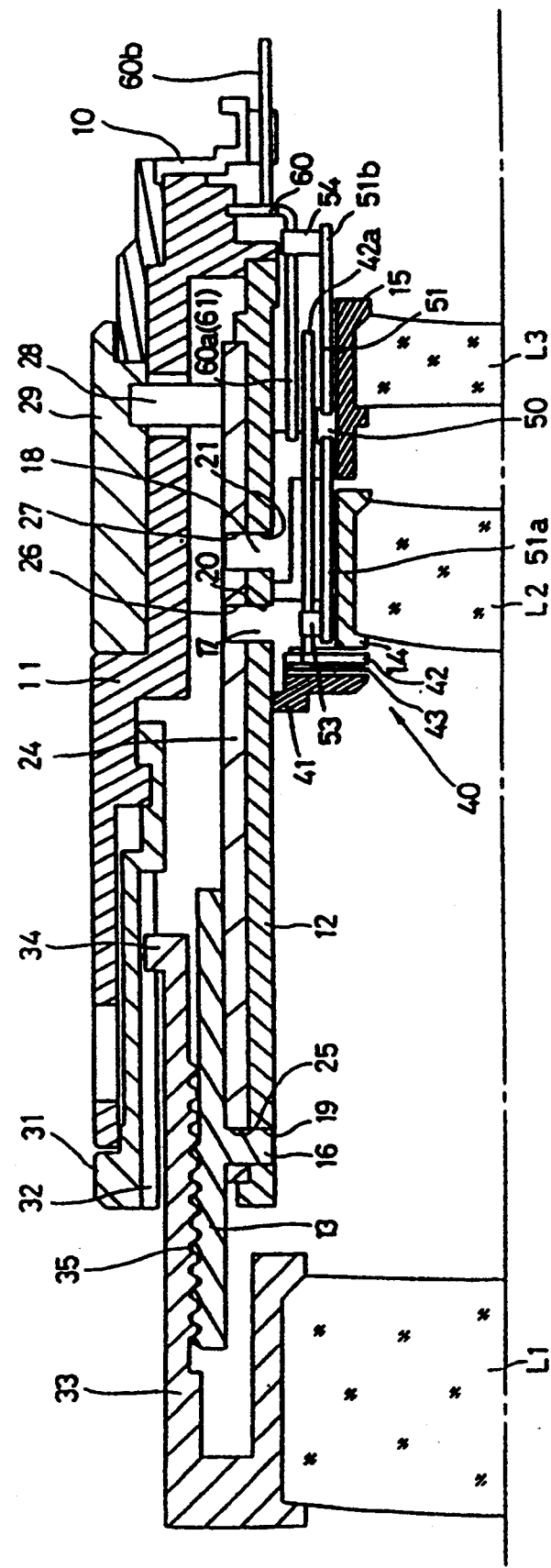
FIG. 1 is a longitudinal sectional view of an upper half of a diaphragm mechanism of a zoom lens barrel, shown in a wide angle extremity position, according to the present invention.
Figure 2:
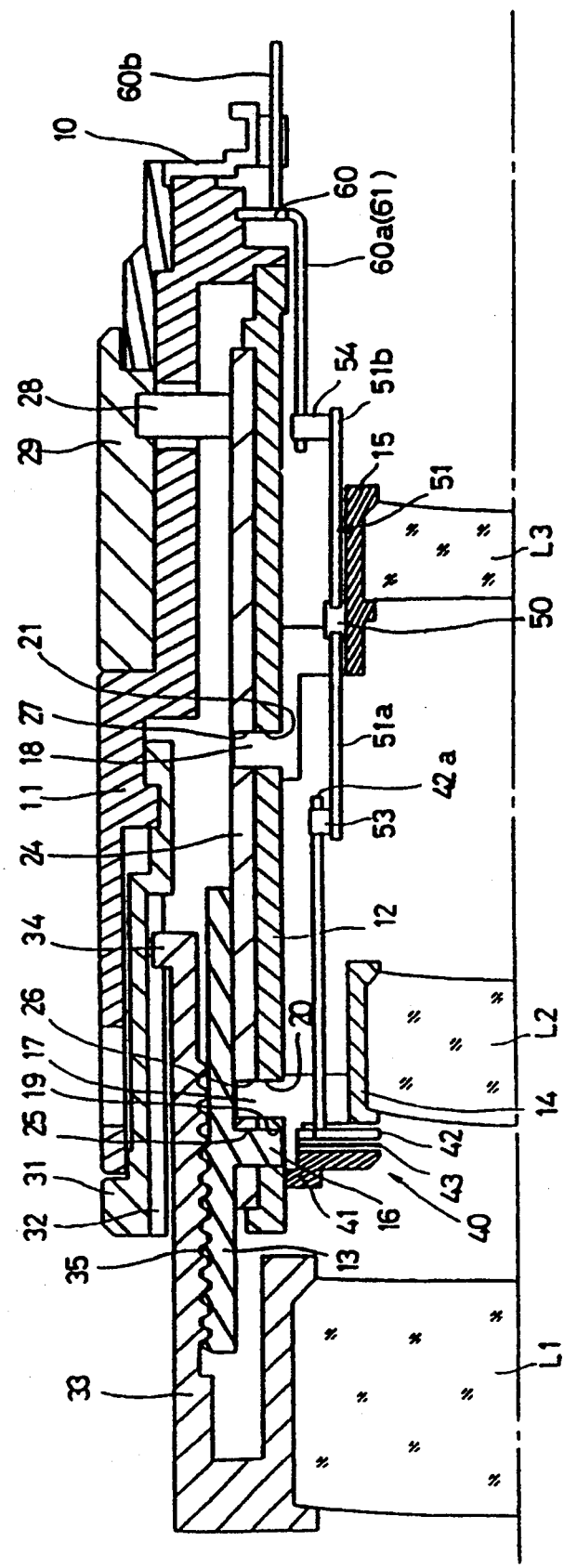
FIG. 2 is a longitudinal sectional view of an upper half of a diaphragm mechanism of a zoom lens barrel, shown in a telephoto extremity position, according to the present invention.
Figure 3:
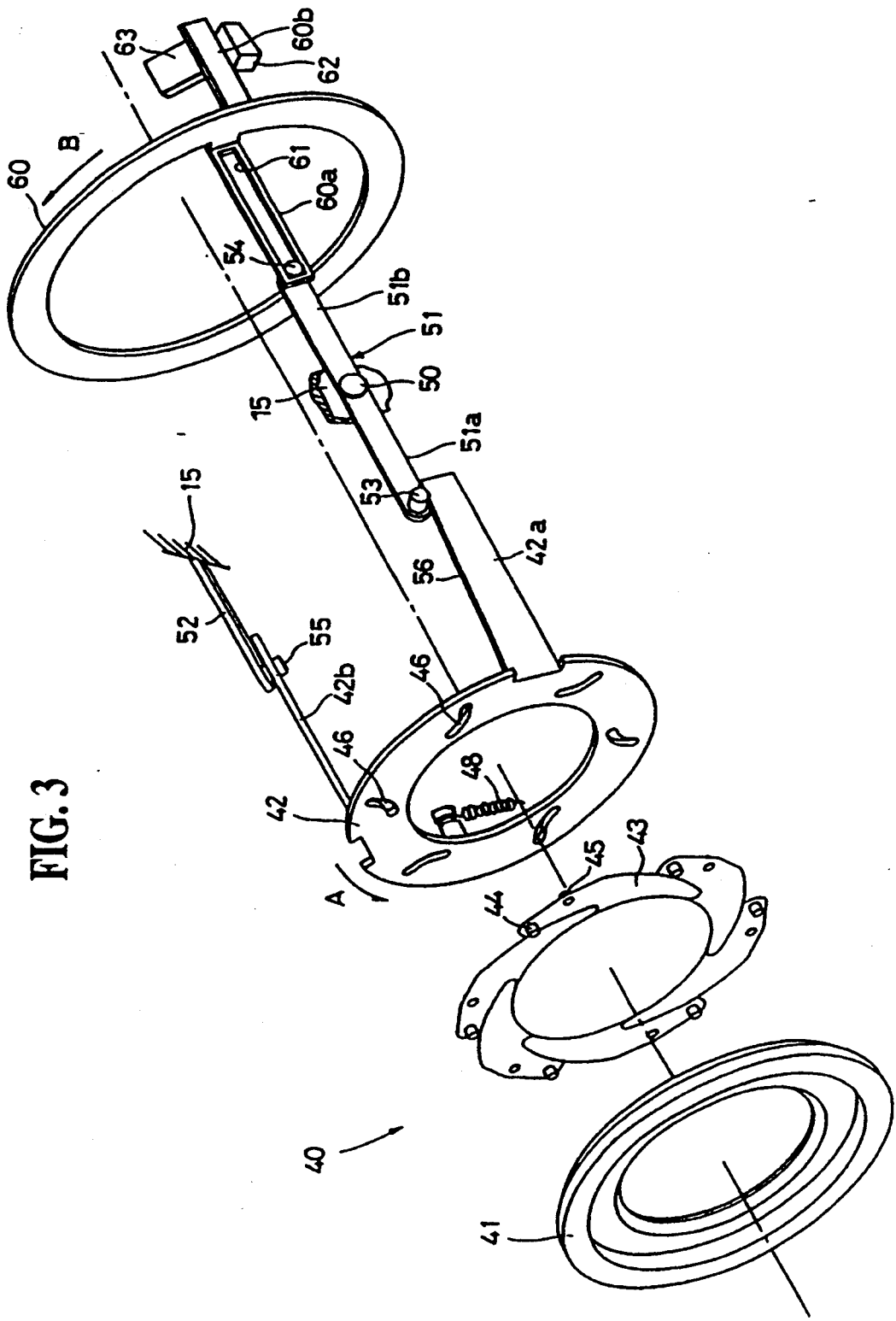
FIG. 3 is an exploded perspective view of a main part of a diaphragm mechanism of a zoom lens barrel shown in FIGS. 1 and 2.

FIGS. 1 through 5 show a first embodiment of a diaphragm mechanism of a zoom lens barrel according to the present invention. In FIGS. 1 and 2, a stationary lens barrel 11, which is secured to a camera body through a lens mount 10, is provided on an inner surface thereof with a linear movement guide cylinder 12 integrally secured thereto. The guide cylinder 12 has linear movement guide grooves 19, 20 and 21 to guide a linear movement of a helicoid ring 13, a second lens frame 14 which holds the second lens group L2, and a third lens frame 15 which holds the third lens group L3 in the optical axis direction. The helicoid ring 13, the second lens frame 14, and the third lens frame 15 are located in this order as viewed from the front, and have guide pins 16, 17 and 18 projecting in the radial directions of the cylinder, so that the guide pins are fitted in the corresponding guide grooves 19, 20 and 21, respectively.

A cam ring 24 is rotatably mounted to the outer peripheral surface of the guide cylinder 12. No axial movement of the cam ring 24 relative to the guide cylinder 12 is permitted. The cam ring 24 is provided with cam grooves 25, 26 and 27 in which the guide pins 16, 17 and 18 are fitted. The cam profiles of the cam grooves 25, 26 and 27 are such that the lens groups L1, L2 and L3 are moved along the tracks, for example, as shown in FIG. 9. The cam ring 24 is connected to a zoom ring 29 which is rotatably mounted to the outer peripheral surface of the stationary lens barrel 11 through an association pin 28 which projects in the radial direction thereof so as to rotate together with the zoom ring 29.

The stationary lens barrel 11 is provided, on the front end of the inner peripheral surface thereof, with a focus ring 31 which is rotatably mounted thereto. A first lens frame 33 is provided in the focus ring 31 and is screw-engaged by the helicoid ring 13 through a helicoid 35. The focus ring 31 is provided on the inner peripheral surface thereof with a rotational movement groove 32 which extends in a direction parallel with the optical axis, so that an association pin 34 provided on the first lens frame 33 is fitted in the rotational movement groove 32.

Consequently, when the cam ring 24 is rotated through the zoom ring 29, the helicoid ring 13 (first lens group L1), the second lens frame 14 (second lens group L2) and the third lens frame 15 (third lens group L3) are moved in the optical axis direction along the cam profiles of the cam grooves 25 and 26 to carry out the zooming operation. On the other hand, when the focus ring 31 is rotated, the first lens frame 33 (first lens group L1) is moved in the optical axis direction while rotating in accordance with the helicoid 35 through the rotational movement groove 32 and the association pin 34 to carry out the focusing operation.

In the zoom lens barrel as constructed above, the subject of the present invention is mainly addressed to a diaphragm drive mechanism of a diaphragm mechanism 40 provided on the second lens frame 14. The diaphragm mechanism 40 comprises a diaphragm blade supporting ring 41 secured to the second lens frame 14, and a diaphragm opening and closing ring 42 which is rotatably supported by the second lens frame 14. Each of a plurality of diaphragm blades 43 has a pair of bosses 44 and 45 (see FIG. 3) which are fitted in corresponding supporting holes (not shown) formed in the diaphragm blade supporting ring 41 and corresponding opening and closing grooves 46 formed in the diaphragm opening and closing ring 42, respectively. When the diaphragm opening and closing ring 42 is rotated, the diaphragm aperture defined by the diaphragm blades 43 is opened and closed. The diaphragm opening and closing ring 42 is biased in a direction A to open the aperture by a tensile spring 48 shown in FIGS. 3 through 5. The construction of the diaphragm mechanism, as constructed above, is per se known.

The diaphragm opening and closing ring 42 has an opening and closing lever 42a and an aperture restricting lever 42b, both extending in the backward direction (i.e., in the direction away from the object side).

An intermediate lever 51, which extends in a direction substantially parallel with the optical axis, is pivoted at an intermediate portion thereof with respect to the third lens frame 15 through a pivot pin 50. The third lens frame 15 has an aperture restricting member 52

(FIG. 5) secured thereto, which extends toward the aperture restricting lever 42b.

Intermediate lever 51 comprises a front lever portion 51a which forwardly extends from the pivot pin 50 toward the opening and closing lever 42a, and a rear lever portion 51b which rearwardly extends. The lever portions 51a and 51b are provided on the front ends thereof with bosses 53 and 54, respectively. Also, the aperture restricting member 52 has a boss 55 at the front end thereof. The bosses 53 and 55 engage with cam surfaces 56 and 57 of the opening and closing lever 42a and the aperture restricting lever 42b, respectively.

A diaphragm driving ring 60 on the lens is rotatably supported on the inner and rear surface of the stationary lens barrel 11. The diaphragm driving ring 60 has a front lever 60a extending in a direction parallel with the optical axis and a rear body association arm 60b. The front lever 60a is provided with an elongated hole 61 extending in the optical axis direction. The boss 54 is fitted in the elongated hole 61. The body association arm 60b projects rearwardly beyond the lens mount 10. The diaphragm driving ring 60, on the lens side is biased in a direction (stop-down direction) B by a spring (not shown) having a force greater than that of the tensile spring 48. Namely, the diaphragm mechanism. 40 of the lens barrel is a normally closed type in which the diaphragm aperture is normally biased to be closed, as discussed above.

The camera body (not shown) includes a drive member 63 which engages with the association arm 60b on the camera body side to hold the diaphragm driving ring 60 on the lens side in an open position of the diaphragm aperture against the biasing force in the direction B when the lens barrel is attached to the camera body through the lens mount 10. The drive member 63 on the camera body side is spaced away from the association arm 60b in the direction B when the shutter is released, so that the diaphragm driving ring 60 can be rotated by the biasing force in the direction B. The lens barrel has a stop plate 62 which holds the association member 60b in a predetermined position when the lens barrel is mounted to the camera body.

In the diaphragm mechanism mentioned above, when the lens barrel is mounted to the camera body, the drive member 63 of the camera body is engaged by the association lever 60b against the biasing force in the direction B. In this state, the diaphragm opening and closing ring 42 is rotated in the direction to open the aperture by the force of the tensile spring 48 to thereby open the diaphragm mechanism 40. Furthermore, the cam surface 57 of the aperture restricting lever 42b of the diaphragm opening and closing ring 42 is in contact with the boss 55, and the cam surface 56 of the opening and closing lever 42a is disengaged from the boss 53 of the intermediate lever 51.

When the drive member 63 is moved in the direction B to disengage the association arm 60b therefrom, the diaphragm driving ring 60 on the lens side is rotated by the biasing force in the same direction. The rotation of the diaphragm driving ring 60 causes the intermediate lever 51 to rotate about the pivot pin 50 due to the engagement of the rear association lever 51b in the elongated hole 61 of the front lever portion 60a, so that the boss of the front association lever 51a comes into contact with the cam surface 56 of the opening and closing lever 42a. Consequently, the diaphragm opening and closing ring 42 is rotated in the stop-down direction against the tensile spring 48. The amount of stop-down (desired aperture diameter) is determined by the displacement of the drive member 63 on the camera body side in the direction B.

According to the present invention, since the intermediate lever 51 is pivoted with respect to the third lens frame 15 through the pivot pin 50, as mentioned above, the length of the front lever portion 60a (elongated hole 61) of the diaphragm driving ring 60 on the lens side can be shortened only to cover the displacement of the third lens group L3. Furthermore, the whole length of the front association lever portion 51a of the intermediate lever 51 and the opening and closing lever 42a of the opening and closing ring 42 is set so as to cover the difference in the maximum displacement between the second lens group L2 and the third lens group L3.

In a conventional zoom lens barrel (prior art), since the intermediate lever 51 is supported by the second lens frame 14 together with the diaphragm mechanism 40, as mentioned above, it is necessary to lengthen the rear association lever 51b and the front lever portion 60a (elongated hole 61) of the diaphragm driving ring 60 in order to accommodate the displacement of the second lens group L2. Conversely, in the present invention, the diaphragm opening and closing ring 42, the intermediate lever 51, and the diaphragm driving ring 60 can be shortened as a whole. Accordingly, no inclination or deflection of the levers takes place, resulting in a diaphragm control having a high precision.

The cam surface 57 of the aperture restricting lever 42b is adapted to restrict the variation of the open F number during the zooming operation or maintain a constant open F number. Namely, if the mechanical aperture diameter is constant, the F number varies in accordance with the change of the focal length. Variation of the F number is not serious in certain lenses, but if necessary, it can be eliminated by varying the mechanical aperture diameter depending on the change in focal length during the zooming operation.

The cam surface 57 is shaped so that no variation of the open F number occurs. Namely, when the lens barrel is mounted to the camera body, the diaphragm opening and closing ring 42 is rotated in the direction to open the aperture by force of the tensile spring 48, so that the cam surface 57 of the aperture restricting lever 42b thereof comes into contact with the boss 55 of the aperture restricting member 52. Since the aperture diameter is determined by the angular position of the diaphragm opening and closing ring 42, the open F numbers at the respective focal lengths can be set by the shape of the cam surface 57.

Figure 4:
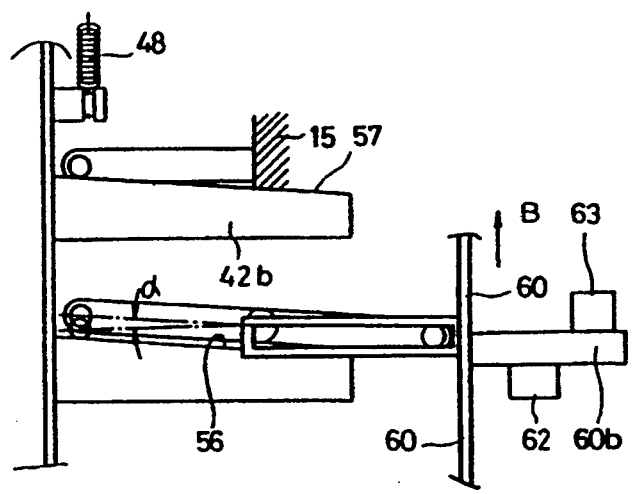
FIG. 4 is a side elevational view of a main part of a diaphragm mechanism of a zoom lens barrel, at a wide angle extremity position, according to the present invention.
Figure 5:
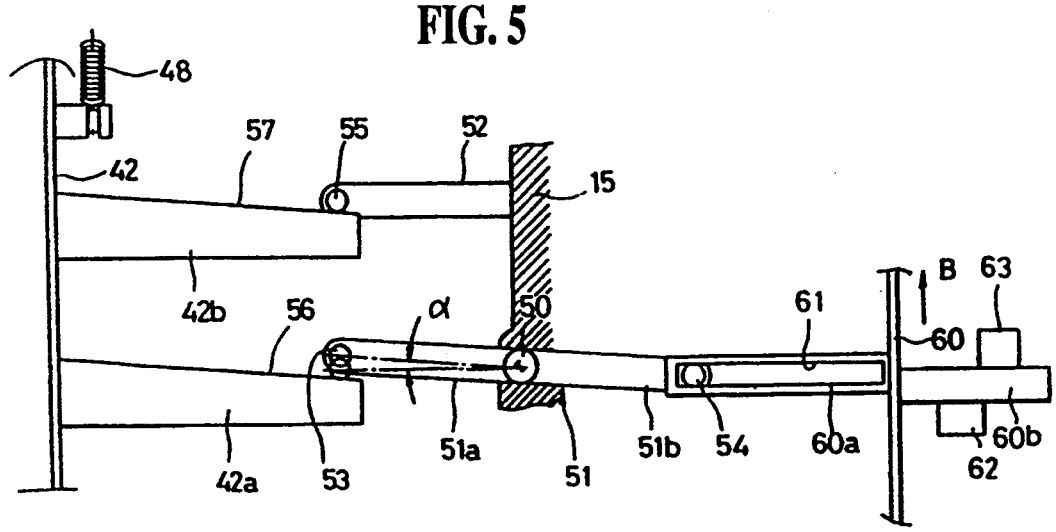
FIG. 5 is a side elevational view of a main part of a diaphragm mechanism of a zoom lens barrel, at a telephoto extremity position, according to the present invention.

In the illustrated embodiment, the shape of the cam surface 56 of the opening and closing lever 42a is the same as that of the cam surface 57 of the aperture restricting lever 42b. The identical shape of the cam surfaces 56 and 57 ensures an identical distance (angle $\alpha$) between an original position of the boss 53 and a contacting position at which the boss 53 comes into contact with the cam surface 56 upon stop-down in the whole zoom range from the telephoto extremity position to the wide angle extremity position, as shown in FIGS. 4 and 5. Namely, the period of time from the commencement of the diaphragm driving ring 60 movement on the lens side to the commencement of the rotation of the diaphragm opening and closing ring 42, caused by the contact of the boss 53 of the intermediate lever 51 with the diaphragm opening and closing ring 42, is substantially constant throughout the zoom range. Accordingly, conditions such as the stop-down speed are substantially identical throughout the zoom range.

Figure 6:
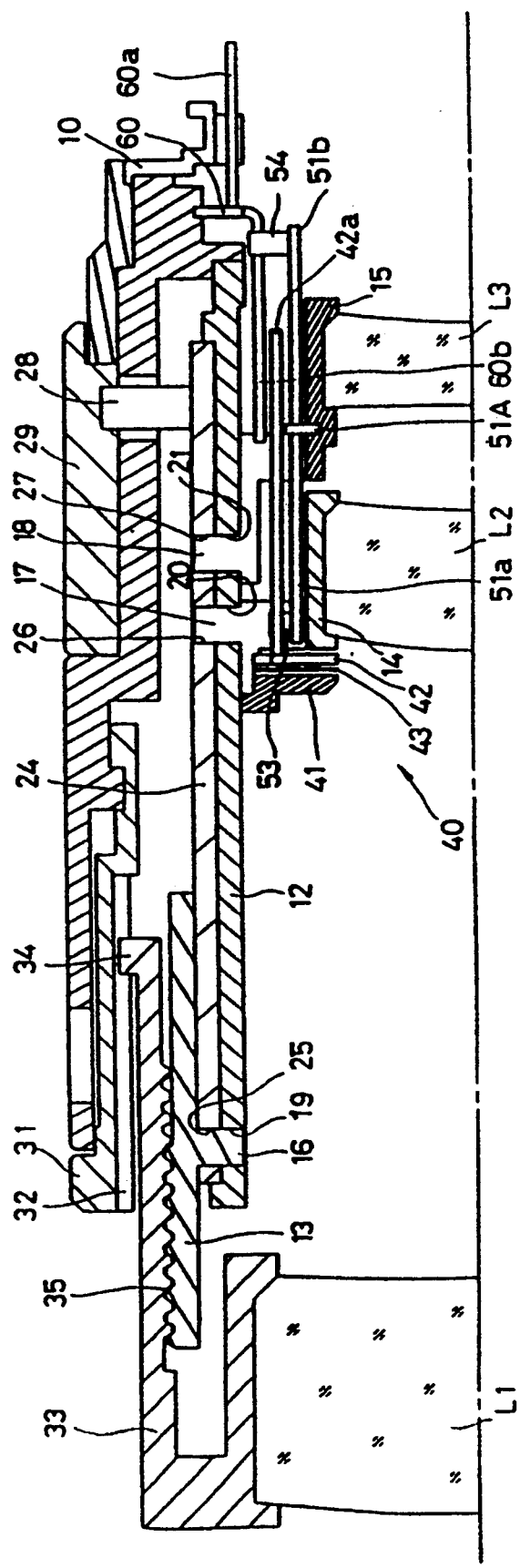
FIG. 6 is a longitudinal sectional view of an upper half of a diaphragm mechanism of a zoom lens barrel, shown in a wide angle extremity position, according to a second embodiment of the present invention.
Figure 7:
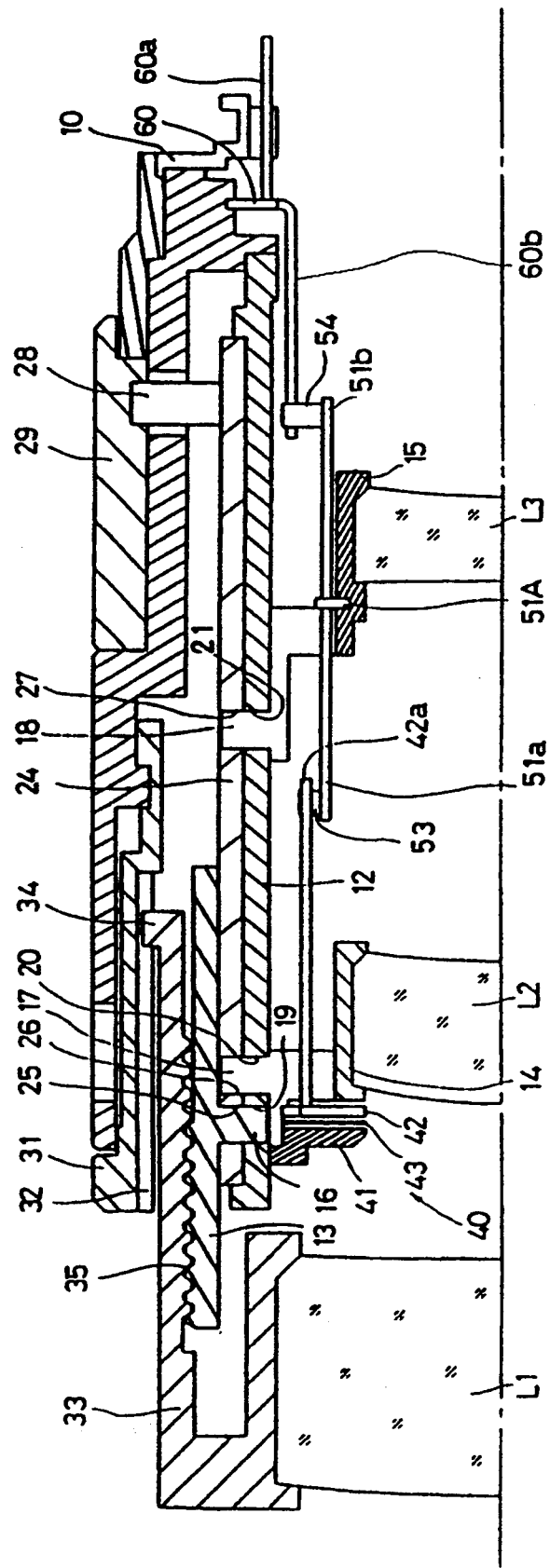
FIG. 7 is a longitudinal sectional view of an upper half of a diaphragm mechanism of a zoom lens barrel, shown in a telephoto extremity position, according to a second embodiment of the present invention.
Figure 8:
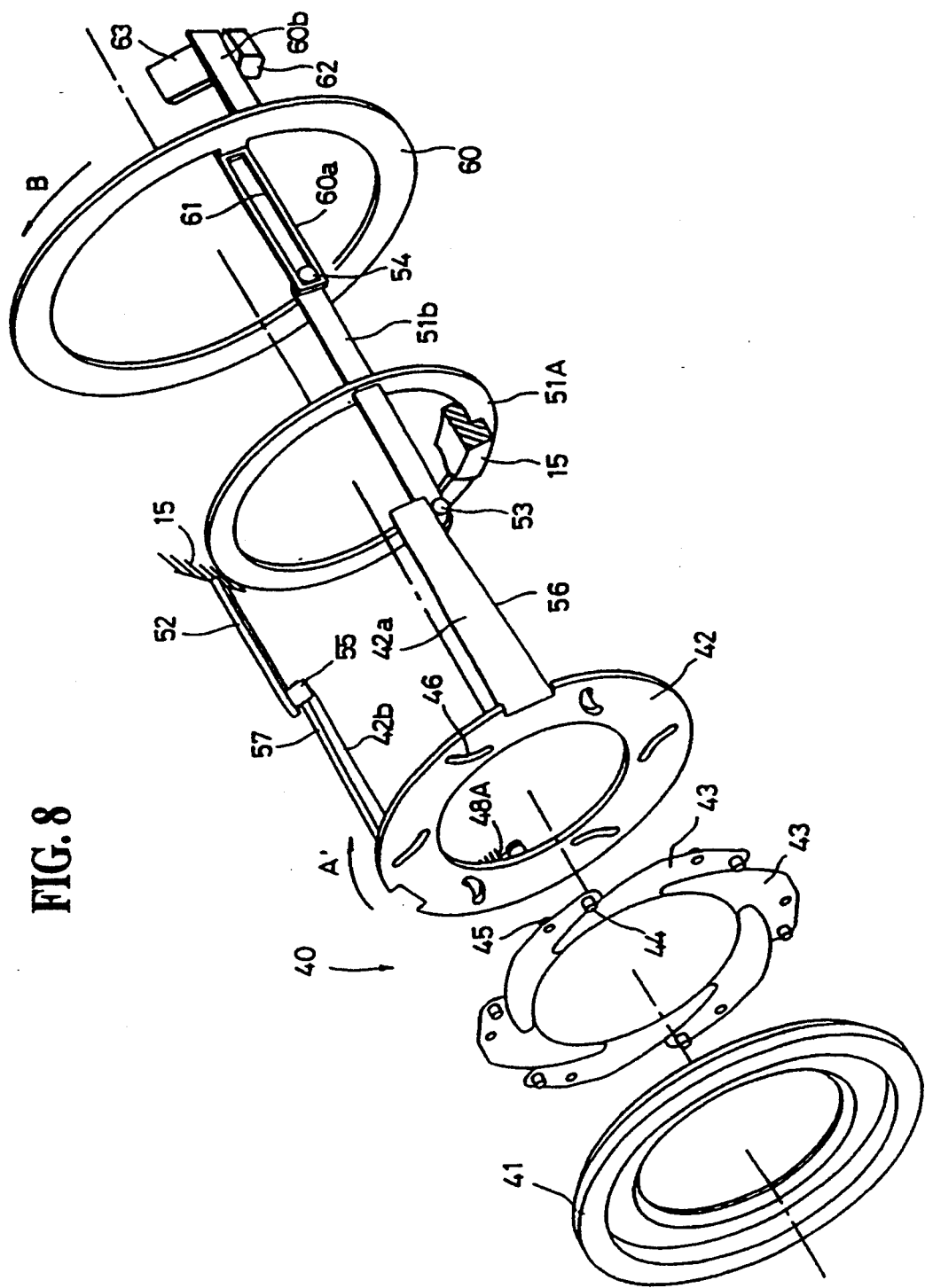
FIG. 8 is an exploded perspective view of a main part of a diaphragm mechanism of a zoom lens barrel shown in FIGS. 6 and 7; and, FIG. 9 is an explanatory diagram showing tracks of the movement of the zoom lens including three lens groups.

FIGS. 6 through 8 show a second embodiment of the present invention.

In the second embodiment, shown in FIGS. 6 through 8, the intermediate lever 51 in the first embodiment, illustrated in FIGS. 1 through 5, is replaced with an intermediate ring 51A which is supported on the third lens frame 15 so as to rotate about the optical axis. The intermediate ring 51A is provided with front and rear association levers 51a and 51b. The intermediate ring 51A rotates (i.e., does not swing). Accordingly, the direction of movement of the front association lever 51a is opposite that in the first embodiment. Consequently, when the diaphragm opening and closing ring 42 of the diaphragm mechanism 40 is rotated in the direction A', opposite to the direction A in FIG. 3, the aperture is opened. The tensile spring 48A biases the diaphragm opening and closing ring 42 in the direction A'. The opening and closing lever 42a and the aperture restricting lever 42b of the diaphragm opening and closing ring 42 are provided, on the surfaces thereof, opposite to those in the first embodiment, with cam surfaces 56 and 57. The operation and function of the diaphragm mechanism of the second embodiment are substantially identical to those in the first embodiment.

As can be understood from the above discussion, in a zoom lens barrel including a front movable lens group which is moved together with a diaphragm mechanism, a rear movable lens group behind the front movable lens group, a diaphragm driving member which engages with a diaphragm driving member on a camera body, and an intermediate drive transmitting member which transmits movement of the diaphragm driving member of the lens barrel to the diaphragm mechanism, according to the present invention, the intermediate drive transmitting member is supported on a rear lens frame which holds the rear movable lens group. Accordingly, the diaphragm driving member on the lens side, and the intermediate drive transmitting member can be shortened. Consequently, no inclination or deflection of the levers tends to occur, resulting in a precise and stable control of the diaphragm. Furthermore, due to the shortened diaphragm driving member and intermediate drive transmitting member, the space (recess, etc.) necessary to move the same can be made small, so that no internal reflection occurs and no stray light is produced.

I claim:

1. A diaphragm mechanism provided in a zoom lens barrel including a front moveable lens group which is moved together with the diaphragm mechanism, a rear moveable lens group located behind the front moveable lens group, a rear lens frame which holds the rear moveable lens group, the diaphragm mechanism comprising a lens barrel diaphragm driving member which can engage with a diaphragm driving member provided on an associated camera body, and an intermediate drive transmitting member which transmits movement of said lens barrel diaphragm driving member to the diaphragm mechanism, said intermediate drive transmitting member being supported on the rear lens frame for movement with said rear lens frame during a zooming operation of said zoom lens barrel.

2. A diaphragm mechanism according to claim 1, wherein said intermediate drive transmitting member comprises an intermediate lever which is pivoted at an intermediate portion thereof with respect to the rear lens frame.

3. A diaphragm mechanism according to claim 1, wherein said intermediate drive transmitting member comprises an intermediate ring which is supported on the rear lens frame to rotate about an optical axis of the zoom lens barrel.

4. A diaphragm mechanism according to claim 1, further comprising:
a diaphragm opening and closing ring which rotates to open and close a diaphragm of the diaphragm mechanism, said diaphragm opening and closing ring being provided with an opening and closing lever which engages with said intermediate drive transmitting member; and,
an aperture restricting lever which can be engaged by an aperture restricting portion provided on a member in the zoom lens barrel at a predetermined circumferential position to determine an aperture diameter.

5. A diaphragm mechanism according to claim 4, wherein said aperture restricting lever is provided with a cam surface having a predetermined shape which is engaged by said aperture restricting portion, said cam surface comprising means for ensuring that a substantially constant open F number is maintained regardless of a change in the focal length of a zoom lens in which said diaphragm mechanism is provided.

6. A diaphragm mechanism according to claim 5, wherein said opening and closing lever is provided with a cam surface which is engaged by said intermediate drive transmitting member, said cam surface of said opening and closing lever having a shape that is the same as said predetermined shape of said cam surface of said aperture restricting lever.

7. A diaphragm mechanism according to claim 5, wherein said aperture restricting portion is provided on the rear lens frame.

8. The diaphragm mechanism according to claim 4, said member comprising said rear lens frame.

9. The diaphragm mechanism according to claim 4, said intermediate drive transmitting member being drivingly coupled to said opening and closing lever at a first portion and supported on said rear lens frame at a second portion, a distance defined between said first portion and said second portion, together with a length of said opening and closing lever corresponding to a maximum difference in displacement between said front and rear lens group frames.

10. A diaphragm mechanism according to claim 1, wherein a zoom lens in which the diaphragm mechanism is provided includes three lens groups, said front movable lens group and said rear movable lens group corresponding to a second lens group and a third lens group of the three lens groups, respectively.

11. A diaphragm mechanism according to claim 1, wherein said zoom lens barrel diaphragm driving member comprises a ring member which is rotatable supported on the lens barrel.

12. A diaphragm mechanism according to claim 1, wherein a displacement of the front movable lens group, on which the diaphragm mechanism is provided in the optical axis direction, is larger than the displacement of the remaining movable lens group.

13. A zoom lens barrel of an interchangeable lens camera having first, second and third movable lens groups, comprising:
a second lens frame which supports the second movable lens group;

a third lens frame which supports the third movable lens group;

a diaphragm mechanism which is provided on the second lens frame;

a zoom lens barrel diaphragm driving member which can be engaged by a camera body diaphragm driving member so as to be driven thereby; and, an intermediate drive transmitting member which is provided on the third lens frame and moves with said third lens frame, to transmit movement of said zoom lens barrel diaphragm driving member to the diaphragm mechanism.

14. The zoom lens barrel according to claim 13, said intermediate drive transmitting member being drivingly coupled to the diaphragm mechanism at a first portion and being mounted to said third lens frame at a second portion, a distance defined between said first portion and said second portion, together with a length of an opening and closing lever, engaging said intermediate drive transmitting member, and projecting from a diaphragm opening and closing ring of the diaphragm mechanism, corresponding to a maximum difference in displacement between said second and third lens group frames.

15. The zoom lens barrel according to claim 13, said intermediate drive transmitting member moving with said third lens frame during a zooming operation of said zoom lens barrel.

16. A zoom lens barrel of an interchangeable lens camera, said zoom lens barrel including a diaphragm mechanism, comprising:

a zoom lens barrel diaphragm driving member which can be engaged by a camera body diaphragm driving member to be driven thereby; and an intermediate drive transmitting member which transmits movement of said zoom lens barrel diaphragm driving member to said diaphragm mechanism of the zoom lens barrel;

wherein said diaphragm mechanism includes a diaphragm opening and closing ring which rotates to open and close a diaphragm, said diaphragm opening and closing ring being provided with an opening and closing lever which engages with said intermediate drive transmitting member, and an aperture restricting lever which can be engaged by an aperture restricting portion provided in said zoom lens barrel at a predetermined circumferential position to determine an aperture diameter.

17. A zoom lens barrel according to claim 16, wherein said aperture restricting lever is provided with a cam surface which engages with said aperture restricting portion, said cam surface comprising means for ensuring that a substantially constant open F number is maintained regardless of a change in a focal length of a zoom lens.

18. A zoom lens barrel according to claim 17, wherein said opening and closing lever is provided with a cam surface which engages with said intermediate drive transmitting member and which has a shape which corresponds to a shape of said cam surface of said aperture restricting lever.

19. A zoom lens barrel according to claim 18, further comprising a plurality of movable lens groups and lens frames which hold the respective movable lens groups, wherein said diaphragm mechanism is supported by the lens frame which is located in front of the lens frame of the rearmost lens group, and wherein said intermediate drive transmitting member is supported by the lens frame of the rearmost movable lens group.

20. The zoom lens barrel according to claim 16, said intermediate drive transmitting member being drivingly coupled to said opening and closing lever at a first portion and being secured, at a second portion, to a lens group frame for movement with said lens group frame.

21. The zoom lens barrel according to claim 20, a distance defined between said first and second portions of said intermediate drive transmitting lever together with a length of said opening and closing lever corresponding to a maximum difference in displacement between said lens group frame and said another moveable lens group frame.

22. The zoom lens barrel of an interchangeable lens camera according to claim 16, said intermediate drive transmitting member comprising a pivotally mounted lever.

* * * * *

UNITED STATES PATENT AND TRADEMARK OFFICE
CERTIFICATE OF CORRECTION

PATENT NO. : 5,410,432
DATED : April 25, 1995
INVENTOR(S) : Tomoaki KOBAYASHI

It is certified that error appears in the above-indentified patent and that said Letters Patent is hereby corrected as shown below:

At column 8, line 57 (claim 11, line 3), change "rotatable" to --rotatably--.

Signed and Sealed this

First Day of October, 1996

Attest:

BRUCE LEHMAN

Attesting Officer        Commissioner of Patents and Trademarks